United States Patent [19]

Gerber et al.

[11] Patent Number: 5,425,546
[45] Date of Patent: Jun. 20, 1995

[54] CHILD HANDLE COVER AND ENTERTAINMENT CENTER

[76] Inventors: Mary A. Gerber, 1403 Miller Rd.; Mary C. Harris, 731 West La., both of Geneva, Ill. 60134

[21] Appl. No.: 949,403

[22] Filed: Sep. 22, 1992

Related U.S. Application Data

[63] Continuation-in-part of Ser. No. 771,633, Oct. 4, 1991, abandoned.

[51] Int. Cl.$^6$ .................................................. B62B 3/02
[52] U.S. Cl. ............................ 280/33.992; 40/308; 248/459; 108/44; 446/227
[58] Field of Search ............... 446/7, 146, 227, 230, 446/231, 487, 488; 434/432; 280/33.992, 33.993; 40/308, 316, 539, 536, 537, 402; 108/44, 50, 151; 248/456, 459, 447.1, 441.1

[56] References Cited

U.S. PATENT DOCUMENTS

| | | | |
|---|---|---|---|
| 142,447 | 9/1873 | Dubber | 24/629 |
| 2,687,589 | 8/1954 | Brockway | 280/33.992 |
| 2,888,761 | 6/1959 | Miller | 280/33.992 |
| 3,251,543 | 5/1966 | Bush et al. | 280/33.992 |
| 3,581,431 | 6/1971 | Trenovan | 446/488 |
| 3,629,960 | 12/1971 | Roush | 434/432 |
| 4,034,539 | 7/1977 | Economy | 280/33.992 |
| 4,188,851 | 2/1980 | Wolf | 24/629 |
| 4,583,753 | 4/1986 | Economy | 280/33.992 |
| 4,655,502 | 4/1987 | Houllis | 280/33.993 |
| 4,657,248 | 4/1987 | Benaim | 446/487 |
| 4,662,094 | 5/1987 | Jaffe | 40/316 |
| 4,708,691 | 11/1987 | Moore | 446/106 |
| 4,760,660 | 8/1988 | Fast | 40/308 |
| 4,805,937 | 2/1989 | Boucher et al. | 280/33.992 |
| 4,901,901 | 2/1990 | Reitenour | 446/146 |
| 5,004,252 | 4/1991 | Kraper | 280/33.992 |

FOREIGN PATENT DOCUMENTS

| | | | |
|---|---|---|---|
| 0297452 | 1/1989 | European Pat. Off. | 280/33.992 |
| 2176332 | 12/1986 | United Kingdom | 280/33.992 |
| 2182000 | 5/1987 | United Kingdom | 280/33.992 |
| 8908040 | 9/1989 | WIPO | 280/33.992 |

*Primary Examiner*—Mickey Yu
*Attorney, Agent, or Firm*—Allegretti & Witcoff, Ltd.

[57] ABSTRACT

The invention comprises a disposable handle cover and entertainment center which may be detachably secured to a shopping cart handle. The invention provides the child with a more sanitary environment and also amuses and arouses the attention of the child carried in the shopping cart. The handle cover and entertainment center is of a rigid material e.g., cardboard or the like, and is therefore relatively inexpensive. Furthermore, the handle cover and entertainment center provides at least one amusement item and is also equipped with a drawing surface where the child can either draw or color with a drawing instrument included with the handle cover and entertainment center. The entertainment center can also contain advertisements or other commercial messages, or it can be in the form of a bingo card.

6 Claims, 4 Drawing Sheets

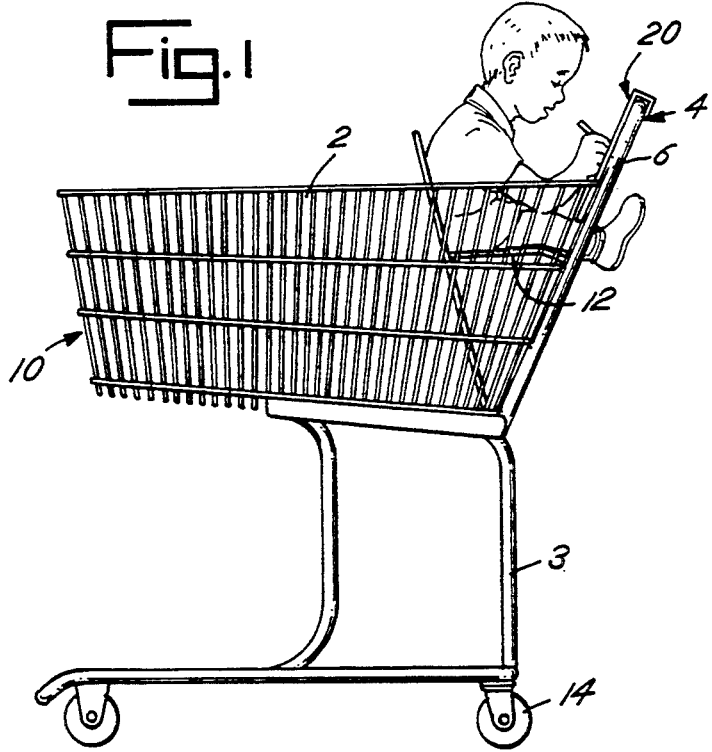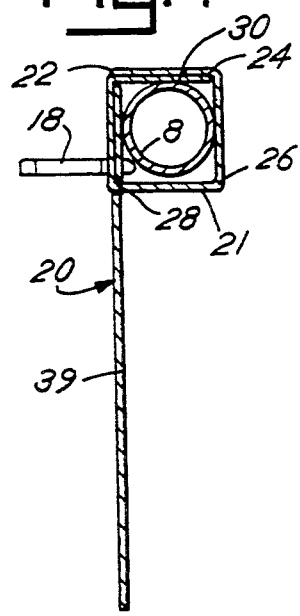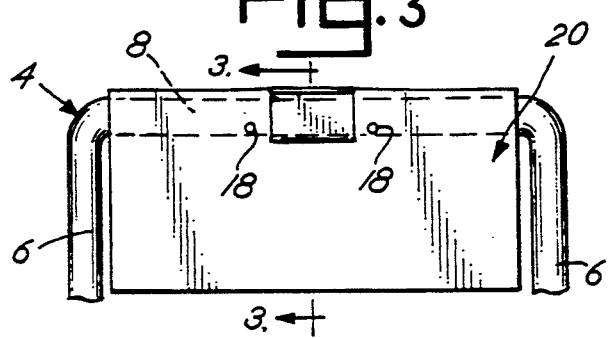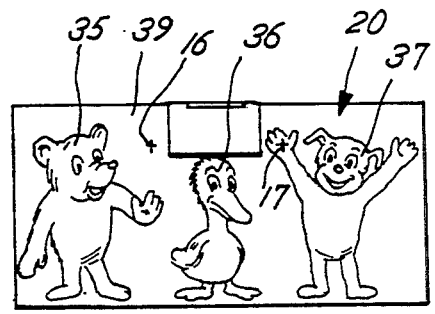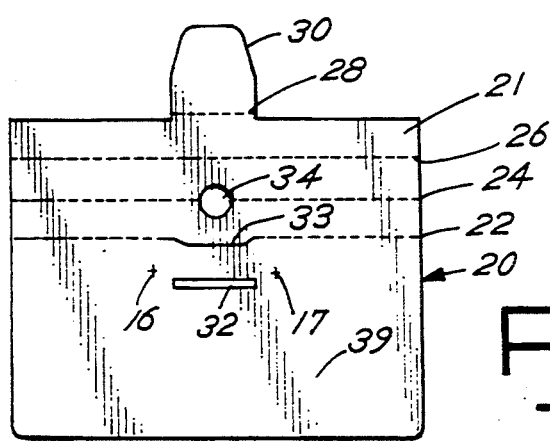

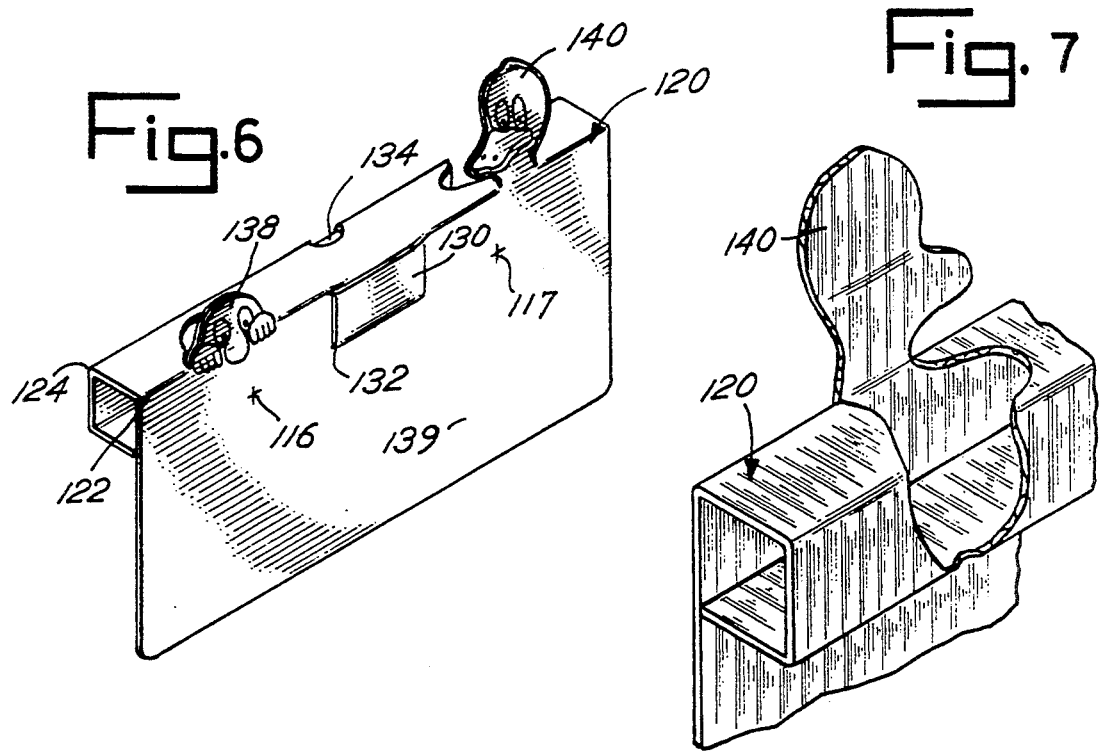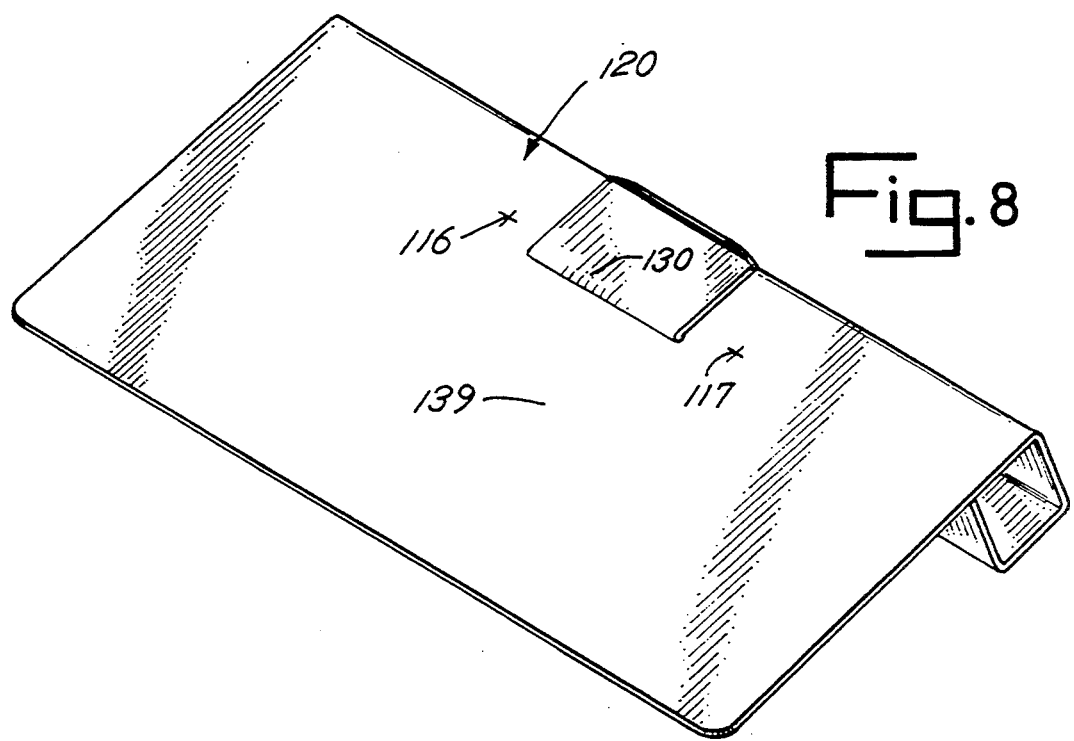

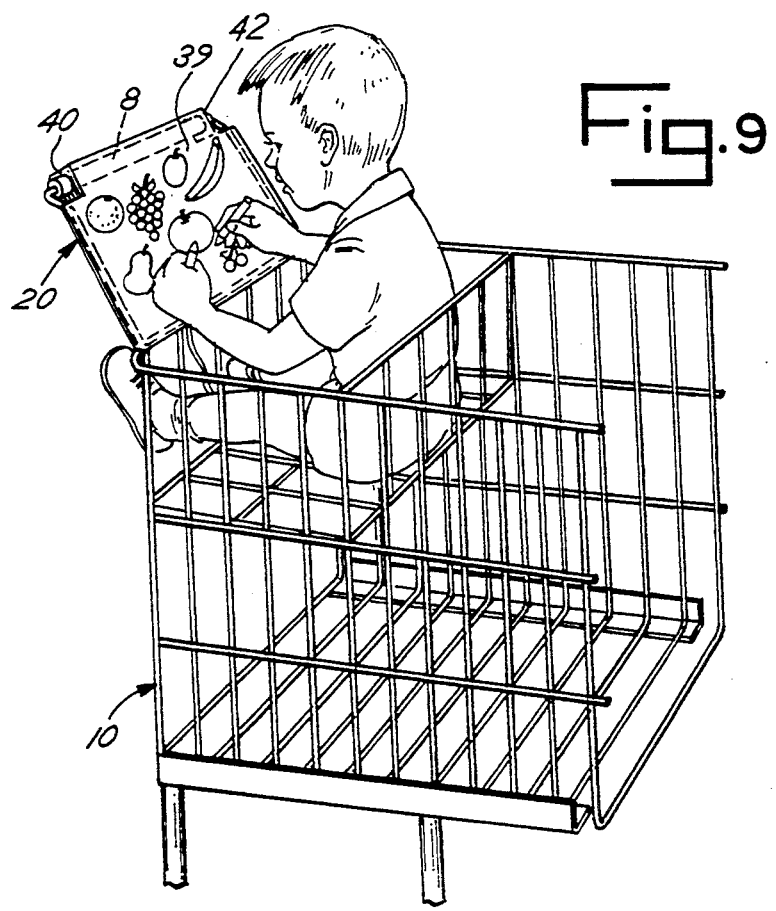
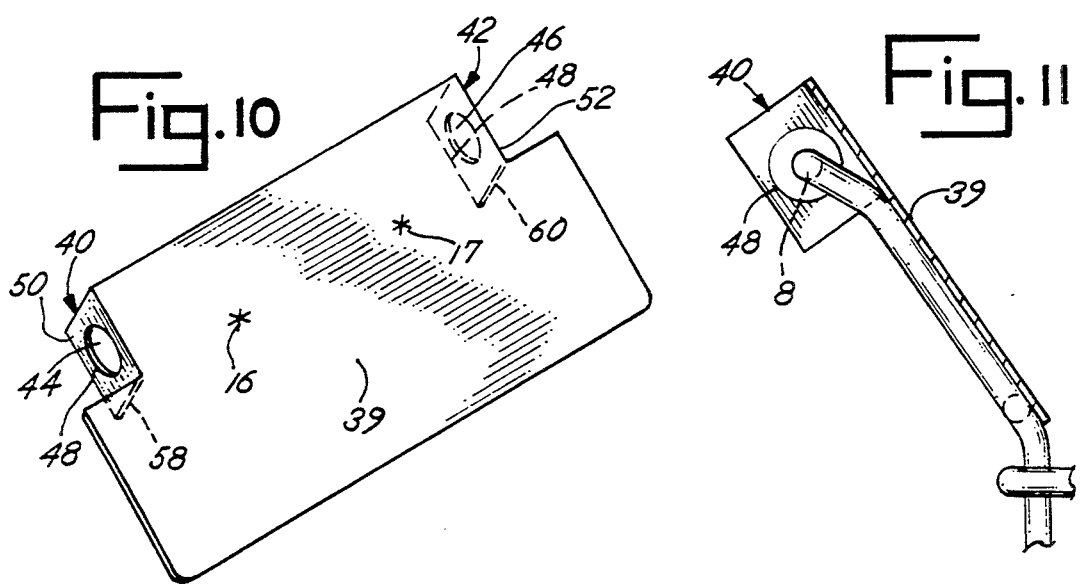

CHILD HANDLE COVER AND ENTERTAINMENT CENTER

This application is a continuation-in-part of application Ser. No. 07/771,633 filed Oct. 4, 1991, abandoned.

BACKGROUND OF THE INVENTION

This invention relates generally to an entertainment device for a shopping cart handle. More particularly, this invention pertains to an improved handle cover and entertainment center which is disposable and readily applied to and removable from a grocery store shopping cart handle.

The majority of shopping carts are equipped with a seat in which a child may be placed while the accompanying adult is shopping. The child faces the rear of the shopping cart and grips on to the handle. These shopping carts are handled and used by so many persons that they are not at all sanitary. To protect the child from this type of contamination is highly desirable. In addition, a child who is bored and causing a ruckus is a disturbance not only to the accompanying adult but to nearby shoppers as well.

A disposable and removable cover for a shopping cart handle can correct and help alleviate the above mentioned problem. "Entertainment centers" to amuse and entertain infants are well-known in the art. For example, in Williams et al. U.S. Pat. No. 4,722,713, there is shown a toy having a support assembly for attaching it to a crib whereby things to arouse attention are connected to and hanging from the arched support. A similar device is described by Stubbmann in U.S. Pat. No. 3,978,610. Furthermore, Klinger, U.S. Pat. No. 4,540,219, shows a similar device which is intended for an infant car safety seat. Bringmann U.S. Pat. No. 3,866,649, discloses a handle cover with a zipper closure that can be used on a shopping cart. The Bringmann patent provides a plasticized polyvinyl chloride covering which includes a string of beads or a similar amusement device as the form of entertainment. In addition, Miller, U.S. Pat. No. 2,888,761, Houllis, U.S. Pat. No. 655,502, Boucher, U.S. Pat. No. 4,805,937, Reitenour, U.S. Pat. No. 4,901,901, Economy, U.S. Pat. No. 4,583,753, PCT Patent No. 89/08040, U.K. Patent No. 2 182 000 A, U.K. Patent No. 2 176 332 A, EPC Patent No. 0 297 452 A2 and Kraper, U.S. Pat. No. 5,004,252, disclose shopping cart handle covers with various attachment devices and seat cushions. Furthermore, Trenovan, U.S. Pat. No. 3,581,431 and Moore, U.S. Pat. No. 4,708,691 disclose folding blanks and building forms which result in three-dimensional structures. Froush, U.S. Pat. No. 3,629,960 discloses a removable desk top packet containing multiple learning and teaching devices to be placed on a desktop.

Conventional entertainment centers are not always completely satisfactory. A child and his parent or parents are always seeking for something new. In this instance, the prior art either does not offer the proper attachment assembly in order to use the entertainment center on a shopping cart or the assembly does not provide a disposable type material (e.g., cardboard) so that the entertainment center may be discarded after a single use. Furthermore, the prior art offered amusement devices that were more appropriate for an infant as opposed to a child.

A primary object of the present invention is to provide a handle cover and entertainment center for a shopping cart that provides a sanitary environment for the child.

Another object of the present invention is to provide a disposable and removable handle cover and entertainment center that is relatively inexpensive to fabricate and easy to use.

A further object of the present invention is to provide a handle cover and entertainment center for a shopping cart that will amuse, stimulate, and arouse the attention of the child carried therein.

Yet another object of the present invention is to provide a handle cover and entertainment center for a shopping cart that will grant the accompanying adult the freedom of a relaxed environment without the distraction of a child's commotion and allows the adult to more readily complete the task of shopping.

These together with other objects and advantages of the present invention will be made more apparent hereinafter.

BRIEF SUMMARY OF THE INVENTION

In a principal aspect, the present invention comprises a handle cover and entertainment center for attachment to a shopping cart handle. The handle cover and entertainment center comprises a handle guard with a releasable securing means for retaining the handle guard in wrapped around condition on the shopping cart handle. It includes an extended generally rectangular sheet made from a rigid material which provides an entertainment or drawing area and at least one amusement item preferably in the form of a cartoon drawing on the drawing area. Furthermore, there is also included at least one drawing instrument and at least one drawing instrument holder. The handle cover and entertainment center may be constructed of cardboard or some other relatively low cost material which provides a stiff or rigid surface to enable the child to engage in amusement activities, such as drawing or coloring. In addition, the drawing instrument included in the handle cover and entertainment center may, for example, be in the form of a crayon. The drawing instrument is supported on the handle cover and entertainment center by an instrument holder which is in the form of slits defining a hole or aperture within the entertainment or drawing area.

BRIEF DESCRIPTION OF THE DRAWING

There are shown in the drawings a presently preferred embodiment of the invention, wherein like numerals refer to like elements in the various views and wherein:

FIG. 1 is a side elevation view of the shopping cart and the handle cover and entertainment center as it would appear while in use by the infant;

FIG. 2 is a plan view of the handle cover and entertainment center blank;

FIG. 3 is a partial plan view of the handle cover and entertainment center as it appears when attached to the shopping cart handle;

FIG. 4 is a side sectional view of the handle cover and entertainment center taken generally along the line 4—4 of FIG. 3;

FIG. 5 is a plan view of the entertainment or drawing area with representative cartoon characters shown on the front surface of the area;

FIG. 6 is a perspective view of a modified handle cover and entertainment center;

FIG. 7 is a perspective view of the back of the modified handle cover and entertainment center illustrating a pop-up cartoon character; and FIG. 8 is a perspective view of the handle cover and modified entertainment center as it may appear when placed on a rigid surface such as a desk.

FIG. 9 is a perspective view of a shopping cart and an alternative handle cover and modified entertainment center as it would appear while in use by the infant;

FIG. 10 is a perspective view of the alternative modified handle cover and entertainment center illustrated in FIG. 9;

FIG. 11 is a side view of the alternative modified handle cover and entertainment center illustrated in FIG. 9 as it would appear when attached to a shopping cart;

DETAILED DESCRIPTION OF THE PREFERRED EMBODIMENT

Figure 12:
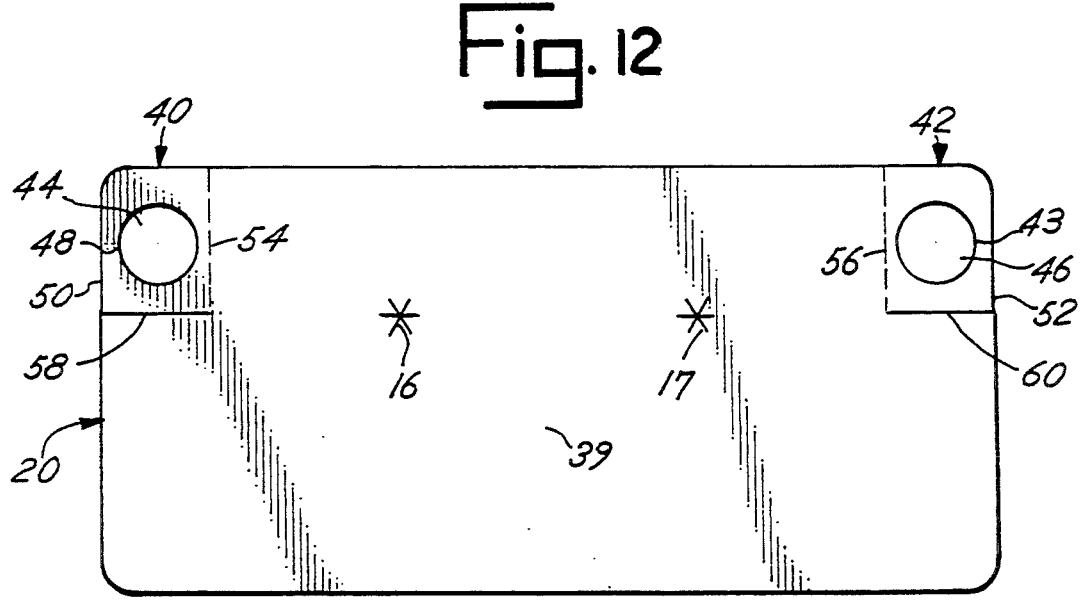
FIG. 12 is a plan view of the alternative handle cover and entertainment center blank.

There is shown in FIG. 1 a shopping cart handle cover and entertainment center 20 which is constructed in accordance with the principles of the present invention. The shopping cart handle cover and entertainment center 20 is preferably fabricated from a rigid material, e.g., cardboard, wood, plastic or paper. In a first preferred embodiment of the invention, the entertainment center 20 comprises a handle guard 21 and an entertainment area 39. Entertainment area 39 has both a longitudinal extent and a transverse extent to accommodate various entertainment items 35, 36, 37 and the like. The shopping cart handle cover and entertainment center 20 is depicted as it would be implemented in the field in cooperation with a conventional wheeled shopping cart 10. More specifically, as shown in FIG. 1, the shopping cart 10 comprises a basket supported on a carrying frame 3 with a U-shaped handle 4 at one end having vertical side supports 6 and a generally horizontally disposed support 8. The shopping cart 10 is mobile due to attached wheels 14 which are secured on the carrying frame 3. Furthermore, the carrying frame 3 includes a raised seat 12 where a child may be placed in order to be carried along while the accompanying adult engages in shopping activities.

The can handle cover and entertainment center 20 is releasably attached to the cart handle 4 as will be made more clear hereinafter. The carrying frame 3 of shopping cart 10 is preferably fabricated from rigid tubular material (e.g., steel) to provide support for the contents to be loaded with the shopping cart basket 2 and for the child to be carried in the shopping cart.

FIG. 2 depicts a blank plan view of the cart handle cover and entertainment center 20. In a first preferred embodiment of the invention, the cart handle cover and entertainment center 20 provides several generally parallel fold lines 22, 24, 26, 28 which are bent or folded at right angles in the same direction to form the handle guard 21 about the shopping cart handle 4. The handle guard 21 of the cart entertainment center 20 is then releasably attached to the cart handle 4 by releasable securing means in the form of a tab member 30. The free end of tab member 30 is tapered to provide easier entry for the member 30 into a first slot 32 and a second slot 33. The tab member 30 passes through slot 32 and into slot 33 until the sides of slot 33 engage the full extent of tab number 30. The tab member 30 is thus locked in place to secure the handle guard 21 on a shopping cart handle 4. The slots 32 and 33 are positioned in the handle cover and entertainment center 20 such that the first slot 32 is spaced from and parallel to second slot 33. The second slot 33 is positioned substantially in the center of the fold line 22. By pushing the tab member from the free end to disengage the tab member 30 from the second slot 33 and pushing the tab member 30 from slot 33 and then releasing it from slot 32 the handle cover and entertainment center can be removed from a shopping cast handle 4. The slots 32 and 33 work in cooperation with the tab member 30 to provide a releasable securing means.

Referring to FIG. 2, the cart handle cover and entertainment center 20 includes an aperture 34 which provides access for a finger to reach and push the free end of tab member 30 to release the tab member 30 from the slot 33 and then from the slot 32. The aperture 34 may be circular, as shown, or a different shape and is sufficiently large so as to enable a user to apply pressure on the end of the tab 30 to push it back out through the slot 32, thereby enabling removal of the handle guard 21.

In FIGS. 2 and 5 there are shown drawing instrument holders 16, 17. Holders 16, 17 are in the form of crossed slits, which when pushed inwardly create an opening that tightly engages the circumference of and provides support to drawing instruments. By positioning these openings above fold line 22, a backing is provided beneath holders 16, 17 (FIG. 4) to prevent the drawing instruments from passing completely through the device and onto the floor. The holders 16, 17 are positioned adjacent the ends of slot 32 and are spaced from the fold line 22. FIG. 3 illustrates the way in which the holders 16, 17 are positioned on the child handle cover and entertainment center 20 when support drawing instruments 18.

FIG. 4 is a side sectional view of the cart handle cover and entertainment center 20 when the entertainment center 20 is attached to the cart handle 4. Furthermore, there is shown extending perpendicular to the center 20 a drawing instrument 18 supported by the instrument holder 17. The drawing instrument 18 may be a crayon, pencil, pen or chalk.

FIG. 5 depicts the cart handle cover and entertainment center 20 with representative amusement items in the form of cartoon characters 35, 36, 37 on the entertainment surface 39. It should be appreciated that the child handle cover and entertainment center 20 may have a variety of cartoon characters or like indicia therein. However, it is desired that there be at least one amusement item on the entertainment surface or area 39. Similarly, surface 39 can contain advertisements or other similar commercial announcements.

FIGS. 6 and 7 provide front and back perspective views of a modified handle cover and entertainment center 20. There is also shown, in FIGS. 6 and 7, various pop-up figures 138, 140 which illustrate another embodiment of the possible cartoon characters or amusement items. Pop-up FIGS. 138, 140 are part of the rigid sheet forming the cart handle cover and entertainment center 20 and appear as figures around which score lines are provided. The score lines included with the pop-up FIGS. 138, 140 facilitate pushing the pop-up FIGS. 138, 140 out from the rigid sheet to an upright position perpendicular to the top surface of the handle guard of the handle cover and entertainment center 20 between fold lines 122, 124 when the fold lines 122, 124 are in an attached position. Furthermore, FIG. 7 depicts the void formed in the cart handle cover and entertainment center 20 when a pop-up FIG. 138 or 140 is pressed out from the rigid sheet of the center 20 to an upright or raised position.

FIG. 8 depicts the entertainment center 20 when placed on a desk or some other like surface for amusement of a child. Therefore, the entertainment center 20 is not limited to use on a shopping cart handle 4 but, may also be implemented on various surfaces whether in an attached or secured position, thereby providing a slanted drawing surface 39.

FIGS. 9-12 depict a second preferred embodiment of the invention. The cart handle cover and entertainment center 20 utilizes modified handle attachment segments 40 and 42. As shown in FIG. 10, the handle attachment segments 40 and 42 each contain circular voids 44 and 46 for attachment about a shopping cart handle. Extending from each circular void is a slit 48 which further extends to the free edges 50 and 52 of the handle attachment segments 40 and 42 to allow the shopping cart handle 8 to be placed within the circular voids 44 and 46. FIG. 11 provides a side view of the modified cart handle cover and entertainment center 20 as it would be used on a shopping cart 10.

Referring to FIG. 12, there is shown a blank cart handle cover and entertainment center 20 which provides two generally parallel fold lines 54 and 56. Fold lines 54 and 56 are bent or folded at right angles in the same direction to form the handle attachment segments 40 and 42. The handle attachment segments 40 and 42 also provide serrated or perforated edges 58 and 60. Serrated or perforated edges 58 and 60 are generally in the same plane, extended in the same direction, and work in cooperation with fold lines 54 and 56 to form handle attachment segments 40 and 42.

Figure 13:
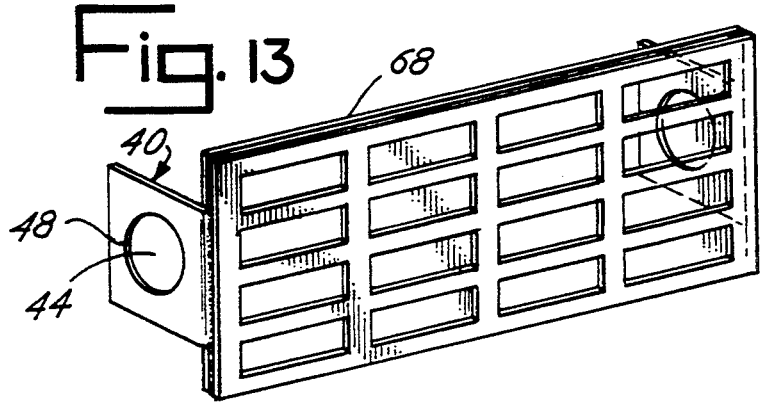
FIG. 13 is a perspective view of another handle cover attachment incorporating a bingo card.
Figure 14:
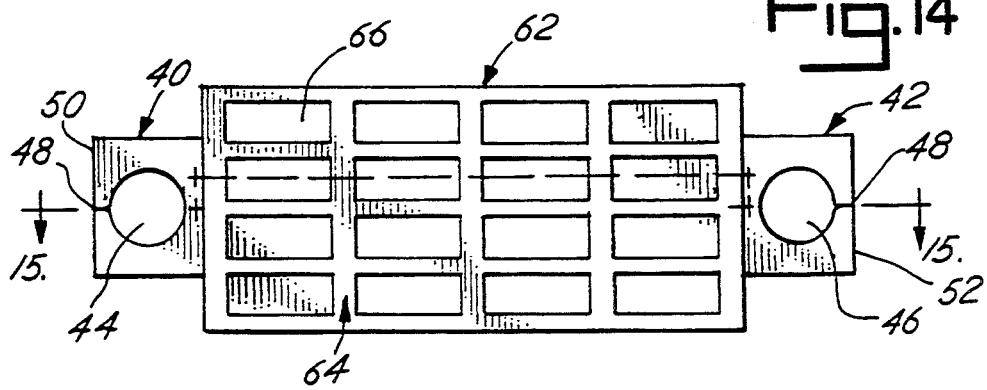
FIG. 14 is a plan view of the modified handle cover and bingo card illustrated in FIG. 13.
Figure 15:
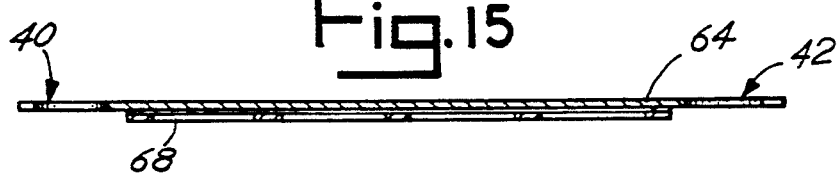
FIG. 15 is a side view of the modified handle cover and bingo card illustrated in FIG. 13.

In FIGS. 13-15 is shown a third embodiment of the invention with an alternate entertainment center 62 in the form of a bingo card. The entire handle attachment segments 40 and 42 operate in the same way as depicted and described for FIGS. 9-12. An alternative embodiment is evidenced in that entertainment center 62 provides a top board cut-out 64 which includes a plurality of see-through windows 66. A support backing 68 is attached to cut-out 64 to allow for the insertion of bingo markers or coupons (not shown). Coupons (not shown) are inserted between the top board cut-out 64 and the support backing 68 in order that they may be viewed through the windows 66 in order to use and redeem the coupons (not shown) with the participating merchant for discounts, cash value or prizes and the like.

FIGS. 13-14 depict the handle cover attachment segments 40 and 42 as being located generally on the center outer sides of the bingo card entertainment center 62. Segments 40 and 42 although centrally positioned, operate in the same way as described above for FIGS. 9-12. This is yet another embodiment of the present invention and does not depart from the essential feature of the present invention.

The cart handle cover and entertainment center is of relatively simple fabrication and can be shipped flat and assembled on site to a shopping cart, as needed. In this application, the invention provides the child with a more sanitary environment and also provides the child with a form of amusement. In another application, the invention may be used simply to provide amusement. The invention is relatively inexpensive in either case.

The present invention may be embodied in other specific forms without departing from the spirit or essential attributes thereof and, accordingly, reference should be made to the appended claims, rather than the foregoing specification as indicating the scope of the invention.

We claim:

1. A single use, integral shopping cart handle cover and child entertainment device, formed from a single piece, planar, foldable blank of cardboard, said cardboard having sections, comprising:

two substantially rectangular handle attachment segments, each formed by folding a section of said single piece, planar, foldable blank of cardboard; said handle attachment segments having a longitudinal extent and a transverse extent with two opposed side edges, namely a first side edge being a fold of said single piece, planar, foldable blank of cardboard and a second side edge being a free side edge, and a serrated bottom edge, the serrated bottom edge allowing for extension of the handle attachment segment perpendicular to the otherwise planar, remaining section of said single piece, planar, foldable blank of cardboard, and a top edge being a free edge; each of said handle attachment segments having a circular void and at least one slit from the free side edge to the circular void to allow the attachment to and quick detachment of said integral shopping cart handle cover and child entertainment device from the shopping cart handle, whereby the shopping cart handle is placed within the circular voids; and a planar child entertainment area being the remaining section of said single piece, planar, foldable blank of cardboard, and being integral with the handle attachment segments, having a longitudinal extent and a transverse extent with two transversely extending free edges, and two longitudinally extending edges, the longitudinally extending edges being partially joined to the handle attachment segments perpendicularly extending from the child entertainment area and integral to the child entertainment area, the transverse extent of the child entertainment area being sufficiently large to fix the child entertainment area during usage by leaning it against the wire rim of the rear portion of the shopping cart.

2. A single use, integral shopping cart handle cover and child entertainment device, formed from a single piece, planar, foldable blank of cardboard, as recited in claim 1, including at least one drawing instrument holder formed within the child entertainment area and being integral with it.

3. A single use, integral shopping cart handle cover and child entertainment device, formed from a single piece, planar, foldable blank of cardboard, as recited in claim 2, including a drawing instrument supported in said drawing instrument holder, wherein the drawing instrument is selected from the group consisting of a crayon, a pencil, a pen, and a piece of chalk.

4. A single use, integral shopping cart handle cover and child entertainment device, formed from a single piece, planar, foldable blank of cardboard, as recited in claim 1, wherein said child entertainment area provides a top board cut-out including a plurality of see-through windows, and a support backing attached thereto, allowing the insertion of bingo markers or coupons between the top board cut-out and the support backing.

5. An unfolded, single piece, planar, foldable blank of cardboard, forming, when folded, a disposable single-use shopping cart handle cover and child entertainment device, comprising:

a substantially rectangular and planar, single blank of cardboard having a longitudinal extent and a transverse extent with two longitudinally extending free side edges, namely the first side edge and the second side edge, having a transversely extending free top edge and a transversely extending free bottom edge;

said planar, single blank of cardboard having two circular voids, namely the first circular void and the second circular void, the radius of the first circular void and the second circular void slightly exceeding the radius of the cross-sectional area of a shopping cart handle, the first circular void being placed near the first side edge and near the top edge and the second circular void being placed near the second side edge and near the top edge;

said planar, single blank of cardboard having an imprint of two marked fold lines, namely the first marked fold line and the second marked fold line, the first marked fold line extending from the top edge, passing the first circular void at a narrow distance and ending a narrow distance below the maximum extension of the first circular void in the direction to the bottom edge of said planar, single blank of cardboard, the second marked fold line extending from the top edge, passing the second circular void at a narrow distance and ending a narrow distance below the maximum extension of the second circular void in the direction to the bottom edge of said planar, single blank of cardboard;

said planar, single blank of cardboard having two serrated cuts, namely the first serrated cut and the second serrated cut, the first serrated cut being substantially parallel to the top edge of said planar, single blank of cardboard and extending from the first side edge up to the end of the first marked fold line, the second serrated cut being substantially parallel to the top edge of said planar, single blank of cardboard and extending from the second side edge up to the end of the second marked fold line; and said planar, single blank of cardboard having two slits, the first slit connecting the first side edge to the first circular void and the second slit connecting the second side edge to the second circular void.

6. An unfolded, single piece, planar, foldable blank of cardboard, forming, when folded, a disposable single-use shopping cart handle cover and child entertainment device, as recited in claim 5, further comprising:

at least one crossed slit within said blank of cardboard, the crossed slit creating, when pushed inwardly, an opening that tightly engages the circumference of a drawing instrument.

* * * * *